United States Patent
Foppe

(10) Patent No.: US 8,235,141 B2
(45) Date of Patent: Aug. 7, 2012

(54) PROCEDURE AND DEVICE FOR THE OPTIMAL, UTILIZATION OF CARBON RESOURCES SUCH AS OIL FIELDS, OIL SHALES, OIL SANDS, COAL, AND $CO_2$

(75) Inventor: Werner Foppe, Geilenkirchen (DE)

(73) Assignee: Franz Josef Radermacher, Ulm (DE)

( * ) Notice: Subject to any disclaimer, the term of this patent is extended or adjusted under 35 U.S.C. 154(b) by 450 days.

(21) Appl. No.: 12/301,104

(22) PCT Filed: May 16, 2007

(86) PCT No.: PCT/EP2007/004363
§ 371 (c)(1),
(2), (4) Date: Dec. 23, 2009

(87) PCT Pub. No.: WO2007/131788
PCT Pub. Date: Nov. 22, 2007

(65) Prior Publication Data
US 2010/0288555 A1    Nov. 18, 2010

(30) Foreign Application Priority Data

May 16, 2006    (DE) .......................... 10 2006 021 330

(51) Int. Cl.
*E21B 7/20* (2006.01)
*E21B 43/24* (2006.01)
(52) U.S. Cl. ........... 175/22; 166/50; 166/22; 166/272.1; 166/272.3; 166/402

(58) Field of Classification Search .................. None
See application file for complete search history.

(56) References Cited

U.S. PATENT DOCUMENTS

| | | | |
|---|---|---|---|
| 4,866,939 A | 9/1989 | Wada | 60/641.2 |
| 5,253,926 A | 10/1993 | Foppe | 299/16 |
| 5,735,355 A | 4/1998 | Bussod | 175/11 |
| 6,016,867 A | 1/2000 | Gregoli | 166/259 |
| 6,591,920 B1 | 7/2003 | Foppe | 175/67 |
| 6,668,554 B1 * | 12/2003 | Brown | 60/641.2 |
| 2007/0223999 A1 * | 9/2007 | Curlett | 405/55 |

FOREIGN PATENT DOCUMENTS
DE    102006018215    11/2007

* cited by examiner

*Primary Examiner* — Zakiya W Bates
(74) *Attorney, Agent, or Firm* — Jonathan Myers; Andrew Wilford

(57) ABSTRACT

A method and system are disclosed for recovering fossil fuel from a carbon deposit site, the method comprising (a) driving several boreholes through the earth's crust to depths below the surface at which supercritical conditions predominate, so that they are spaced from one another in a lower borehole region, and connected there to one another through to form a geo-heat exchanger resulting in creation of a supercritical geo-steam system; (b) injecting fluid into at least one of the boreholes, to convert the injected fluid into a supercritical fluid, and extracting the supercritical fluid through other of the boreholes; and (c) injecting the extracted supercritical fluid into the carbon deposit site to dissolve hydrocarbons contained therein, and transporting the supercritical fluid containing the hydrocarbons to the surface for recovery.

20 Claims, 3 Drawing Sheets

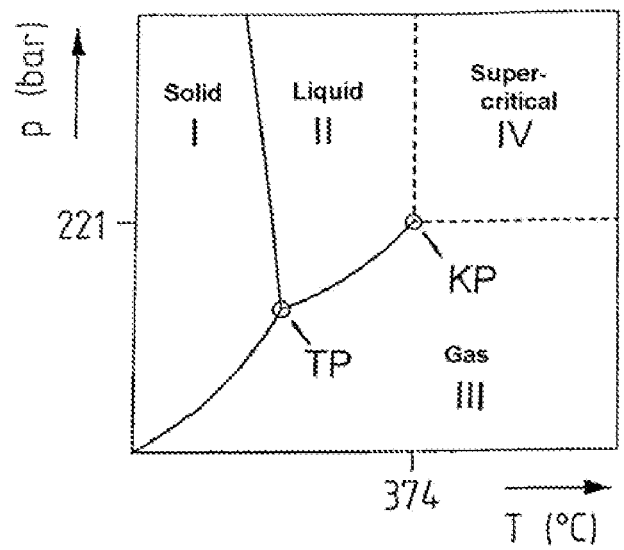
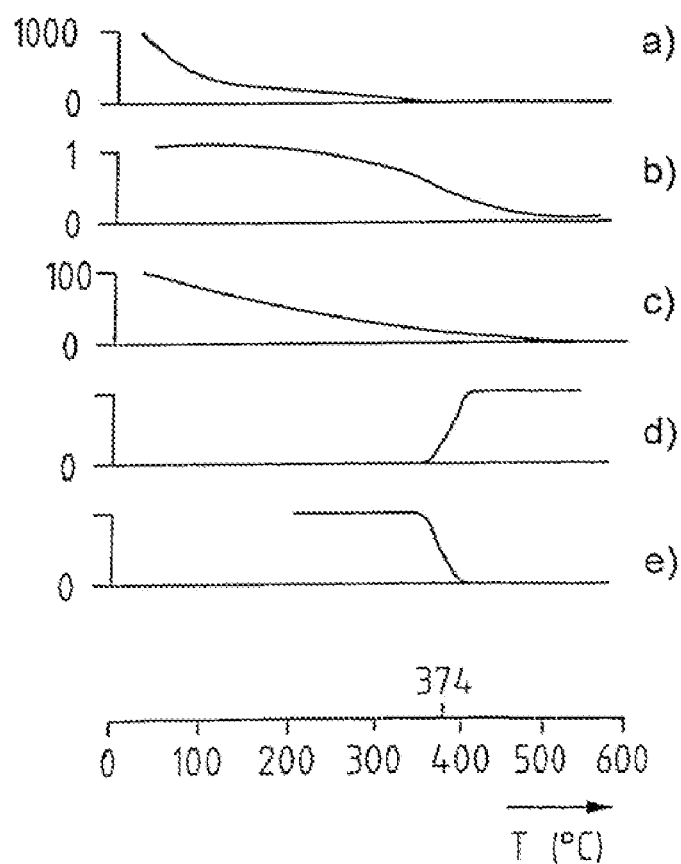
Fig. 3

PROCEDURE AND DEVICE FOR THE OPTIMAL, UTILIZATION OF CARBON RESOURCES SUCH AS OIL FIELDS, OIL SHALES, OIL SANDS, COAL, AND $CO_2$

CROSS REFERENCE TO RELATED APPLICATIONS

This application is the US national phase of PCT application PCT/EP2007/004363, filed 16 May 2007, published 22 Nov. 2007 as WO2007/131788, and claiming the priority of German patent application 102006021330.0 itself filed 16 May 2006, whose entire disclosures are herewith incorporated by reference.

The invention concerns a method and a system for exploiting carbon fossil deposit sites, particularly oil fields, oil sands, oil shales and coal deposits in which by means of a molten-metal drilling method several, particularly three boreholes are driven and each provided with a respective one-piece continuously created casing formed from the molten metal.

The invention further concerns a method of and a system for establishing a $CO_2$ cycle in which several, particularly three boreholes are driven and each provided with a respective one-piece continuously created from the molten metal.

The sinking of super-deep boreholes with borehole diameters of constant size down to the drill target with simultaneous creation of a pressure-resistant, pressure-cast casing can be done according to the molten-metal drilling method that is known from EP 1 157 187 [U.S. Pat. No. 6,591,920].

Thus, a sliding-magnet super-deep drilling method can be used according to today's known art, with which in one continuous fusion drilling process, high pressure resistant, super-deep boreholes with large, dimensionally stable borehole diameter up to a depth of 20 km or more can be produced quickly, inexpensively and production-ready. During the continuous driving of the magnetic conductor fusion drilling system, out of the particularly iron-containing molten-metal that serves as drilling medium, a seamless pressure-cast borehole casing is created that serves as "reaction track" and track for a magnetic conductor.

These pressure-cast cased boreholes are the right size for the method and apparatus according to the invention with the system using supercritical geosteam for optimal exploitation of coal and hydrocarbon deposits or for conversion of carbon carriers with supercritical geosteam for the production of gaseous or liquid fuel and chemical raw material.

With the method of and system for utilizing supercritical geosteam in combination with supercritical heat and pressurized water generating stations as described in 10 2006 018 215.4 the global energy problem at issue is solved everywhere as it relates to electricity, process steam and heat supply. The disclosure of DE 10 2006 018 215.4 is incorporated here by reference.

However, the solution of decentralized heat supply by gases, particularly the fuel issue for a global automotive society which we are becoming, and a seamless transition from the traditional fuel economy to a future $SC_{(supercritical)}$ geosteam economy that is free of fuel, remains open.

The so-called light oil (light sweet crude) was used up primarily in the past 50 years. The prosperity of our automotive industrial society was built on this cheap oil that could be transported inexpensively. At present, the times of cheap oil are over. Exploration costs are rising drastically. Oil reserves are shrinking, the largest oil discoveries are in the past, and since the 60s consumption has increasingly exceeded discoveries.

Even when "peak oil" for "conventional oil" has been achieved, this does not mean that soon no oil will be present in the ground any more, it only becomes significantly more expensive and also scarcer as long as no highly productive technologies for cost-effective and clean recovery of the still large reserves of "unconventional oil" and primarily of the remaining "oil in place" in the "depleted" oil fields will be developed. Up to now, the "recovery rate" of oil fields stood only at 30-40% of OOIP (original oil in place), i.e. 60-70% of the oil of depleted oil fields is still present in oil-bearing rock and at this time it offers the best prospect and fully developed oil source in order to be able to achieve a better balance between supply and demand.

At present, humanity has consumed approximately 1,000 BBO (billion barrel oil). Known conventional oil reserves at current rates of depletion also amount to approximately 1,000 BBO.

Unconventional oil reserves with heavy oil and natural bitumen to be developed are also estimated at approximately 1,000 BBO, in addition there are also the oil shale deposits of 1,000 BBO that jointly result in approximately 3,000 BBO and could be developed with conventional technology, however, at production costs of an average of $50/barrel and an unacceptably high $CO_2$ emission as consequence.

It is the object of the invention to achieve a higher degree of harvesting of the (OOIP), particularly, 80%. From the already depleted oil fields, another 1,000 BBO could thus be harvested according to the invention. From known conventional oil reserves that are not yet being extracted, twice as much could be harvested, i.e. 2,000 BBO, and from the unconventional oil reserves even more than 4,000 BBO could be extracted using supercritical geosteam. In addition to hydrocarbons, there is gas with relatively secure reserves of an additional 2,000 BBO. As a result, with the supercritical geosteam injection method according to the invention, an oil and gas quantity of 9,000 BBO would be available in the future, which would cover the fuel needs of the $21^{st}$ century even for a global automotive society, with production costs that should lie significantly below $10/barrel.

Not included in the calculation is coal, the world deposits of which are estimated at approximately 1,000 billion tons and which are also available with coal hydrogenation as a source of raw materials for fuels and raw chemical materials according to the process of the invention with the system, when supercritical geosteam increasingly replaces fuel technology for electricity production.

Thus, when utilizing the method according to the invention, sufficient hydrocarbon resources are available to supply global industrialization and an automotive society with fuel for over two billion cars, correspondingly high aviation traffic and other transportation far beyond the $21^{st}$ century.

The problem would be one of climate compatibility with the high gas emissions that would be the result of the high fuel consumption needed for such traffic flows, even if the currently largest $CO_2$ emitter worldwide, which is electricity and heat production by combustion is eliminated by the use of supercritical geosteam.

As long as there are no suitable accumulators on the market for storing electricity for automobiles and aircraft of all types, the problem, in spite of electricity, power and heat production by supercritical geosteam lies in satisfying the required need for fuel—as described in patent method of DE 10 2006 018 215.4 mentioned above—in not only making the needed fuel available but also in avoiding the resulting $CO_2$ emissions from it.

According to the invention the $CO_2$ problem is solved in that the boreholes are sunk to depths at which supercritical conditions are predominant and the boreholes are spaced from one another in their lower regions and are connected to one another at their lower ends by subterranean crack formations that form a geo heat exchanger, and hydrogenate sequestered $CO_2$ or carbon, particularly $CO_2$ collected by $CO_2$ generators as a raw material base with supercritical fluid, particularly supercritical water.

Thus in accordance with the invention that $CO_2$ is no longer blown into the air as pollutant, but is saved as a resource and is used as a secondary energy carrier. Just as at present $CO_2$-free coal power plants are being planned, $CO_2$-free cars and airplanes can also be designed. According to the invention, for example, these can be provided with a tank for fuel and $CO_2$. This means—fuel in and $CO_2$ out—and the reverse, or $CO_2$ resulting from burned fuel is sequestered.

According to the invention a climate-tolerant $CO_2$ cycle for transportation and the traffic sector is created in which only small changes in automobiles and in the infrastructure of our gas station networks are to be made. For example, when filling the tank with gas, fluid gas is injected into a double-chamber tank under pressure and simultaneously, sequestered fluid $CO_2$ in the tank is delivered, while corresponding tanker trucks supply gas stations and dispose of the collected $CO_2$ by selling it to supercritical geosteam-operated $CO_2$ hydrogenation plants and industrial consumers.

Fluid $CO_2$ can then, in accordance with the invention, be converted in the supercritical environment of an SSB (geo heat exchanger) that is provided with naturally present or introduced metal catalysts, into an energy-rich carbon compound, for example $CH_4$ (methane).

The freely available hydrogen in supercritical water binds itself—accelerated by catalysts—with the C of the $CO_2$ to the more energetic $CH_4$ or methanol and can be separated simply by reducing pressure. The supercritical sub-surface boiler (SSB=geo heat exchanger) thus becomes the cost-efficient geo large refinery and $CO_2$ becomes a valuable recyclable basic substance as in nature's $CO_2$ cycle or in metal recycling or in the iron and steel industry, that reaches a recycling rate of over 50% in the case of base metals.

SCWO reactor concepts (Oxidyne Deep-Well, 1988) are known that are to be placed in 100-200 m deep boreholes for waste water purification and for complete decomposition of the biomass, but in principle they are not different from SCW reactors on the surface.

In contrast with the method and system in accordance with the invention, these reactors are heated with fuel and the pressure reactor has a technically narrowly limited performance and also consists of a system of expensive material, so that for reasons of pressure and corrosion, SCW reactors were not yet able to assert themselves as large industrial systems in spite of their process advantages.

According to the method or the system of the invention, the supercritical sub-surface boiler (SSB) or geo heat exchanger can become a reactor space with a volume of 10 km$^3$, for example, at pressure of 1,000-2,000 bar at performance volumes of 5 km$^3$/sec in supercritical condition at production parameters of, for example, 600° C./600 bar.

This "natural reactor" does not require any material expense and thus does not have any technical problems related to materials and works at pressures and capacities that cannot even be shown technically.

When $CO_2$ is injected, the SSB (geo heat exchanger) of a supercritical geosteam system is preferred as $CO_2$ hydrogenation plant with a capacity range of $CO_2$ occurrence as needed or fuel need, in addition to the relatively constant electricity, power and process steam generation, as the gas proportion just like the geosteam proportion takes place at the same high temperature and the heat that is extracted by the heat exchanger is used by the supercritical power plants or the pressure in queue is turned into electricity by high pressure turbines and/or utilized as process steam.

Thus, the method according to the invention solves the problem of compatibility with world climate as it relates to the massive $CO_2$ emission by $CO_2$ recycling and by the introduction of a $CO_2$ cycle, as well as the problem of the availability of sufficient fuel for the impending 21$^{st}$ century.

The problem is solved further by sinking the boreholes into depths at which supercritical conditions predominate and the boreholes that are separate from one another in their lower end regions, particularly in the lowest part of the borehole are connected with one another by crack formations that form a geo heat exchanger, whereby as a result a supercritical geosteam system is built that through at least one borehole that is operated as an injection borehole a fluid, particularly water, is injected into the plutonic rock and is brought into supercritical condition in the crack formations, and that is extracted through at least one additional borehole that is operated as production borehole from the plutonic rock and after which the supercritical fluid is injected into a carbon deposit site, carbon compounds in the carbon deposit site are dissolved by the supercritical fluid and are transported to the surface in the fluid.

Thus, according to the invention, supercritical fluid (supercritical geosteam) can be injected from the geo heat exchanger (SSB) into the carbon deposit site for production of carbon compounds.

Thereby, supercritical geosteam in the case of water is to be understood as fluid supercritical water or water vapor, and SSB as a supercritical sub-surface boiler, i.e. a geo heat exchanger that is situated so deep in the crust of the earth that water is present there in supercritical phase, or transitions into such a phase.

Preferably, the supercritical fluid that is extracted from the geo heat exchanger by the at least one production borehole, is not first transported to the surface of the earth, but is transported directly from the at least one production borehole to a carbon storage site. To do so, preferably, the production borehole is drilled directly through the storage site. Alternatively, supercritical fluid is first transported up to the surface and is subsequently injected into the storage site, for example, through existing or also through newly created field boreholes.

In accordance with the invention, at least one super deep borehole, preferably two or more super-deep boreholes, are driven for complete in-situ harvesting of a coal or hydrocarbon deposit site. Super-deep boreholes with a production-ready cast casing with an interior diameter of preferably 0.04 m-0.09 m are sufficient in depths, particularly depths of 10 to 20 km in which supercritical conditions are predominant and the hot rock preferably reaches temperatures of 500° C.-700° C. The super-deep boreholes are preferably run in such a way that at the lowest part of the borehole the boreholes are spaced from one another, particularly at least 1,000 m and are connected with one another by crack formations that are positioned horizontally above one another, particularly over one kilometer long, and particularly elliptical crack formations that serve as heating-up surfaces.

In the hot rock, such heating surfaces can be created, for example, according to the known hydrofracturing method under high water pressure, so that a large geo heat exchanger (SSB—sub-surface boiler) is created in the hot plutonic rock. The expansion of the preferably elliptical heating surfaces generated by hydrofracturing in hot plutonic rock is proportional to the borehole diameter, but particularly to the generated high water pressure, the pressure stability of the borehole casing determining the crack surface expansion and becoming a critical element in the creation of SSB (geo heat exchanger) at great depths and with large expansion, as enormous fluid pressures are required for constructing an SSB.

The method and system in accordance with the invention for optimal harvesting of carbon resources with an aimed for degree of depletion of 80% and more by supercritical geosteam injection works in the opposite manner compared to the previously shown "SSB as hydrogenation plant".

As a result of the supercritical-geosteam injection into the carbon deposit—such as oil fields or coal beds—these become georeactors in which all carbon compounds are dissolved by supercritical geosteam and are transported upward in the fluid.

The most important methods of use for optimal resource extraction is described below using different carbon deposit sites and explained in principle using a schematic drawing (FIG. 1).

APPLICATION EXAMPLE I

"Depleted" Oil Field

As shown in FIG. 1, the oil reserves of an oil field are locked up in a porous rock stratum that is topped by a stratum of impermeable rock. The porous oil-bearing rock stratum underneath the oil is also filled with water, so that so to speak the oil is floating on water. The pressure and fluidity of the oil increases with the depth and temperature of the oil deposit.

The increase in pressure is created in that the highly volatile oil components of the oil form a gas cap above the oil, or are dissolved in the oil as a gas, pressure also increases as a result of the thermal expansion of the water underneath the oil deposit. An oil deposit with low viscosity oil does not need to be pumped, but extracts under its own pressure. With increased duration of transport, the pressure eventually decreases and degasification of the oil takes place so that it can only be transported further with pumps. As a rule, the same conditions also apply for oil with API values under 22°.

According to the prior art, oil that can no longer be pumped or is difficult to be pumped because of its high viscosity is made to have low viscosity or to be at least transportable by pumping gas or steam into it. The costs of steam are very high, as a third of the oil that is extracted in this way is burned in steam production and therefore causes additional serious environmental damage. Of late, sequestered $CO_2$ is also pumped in to increase pressure in oil fields, the total production costs being significantly above $50/barrel.

As a result of these EOR (enhanced oil recovery) steps, the depletion rate still remains significantly under 50%.

In the case of depleted oil fields, surface injection is performed according to the invention starting with the existing boreholes of the oil field, whereby, for example, one field injection borehole (injection well) corresponds to at least one, preferably three, field production boreholes (production wells).

For the required supercritical geosteam system—depending on the size of the field to be harvested—at least one, but preferably two or more super-deep boreholes and a correspondingly large geo heat exchanger or several geo heat exchangers are required that are set up centrally in the oil field or oil field sector that is to be exploited. For example, a supercritical geosteam system with three super-deep boreholes respectively with, for example, 40 cm diameter and a georeservoir with a developed volume of, for example, 10 km³ generates heat of 2,000 $MW_{th}$ for a production volume of supercritical geosteam of 5 m³/sec at 600° C./600 bar or about 1 to/sec.

In heat-insulated high-pressure pipes, the supercritical fluid can be forced into the oil field in one, if necessary several production boreholes of the supercritical geosteam system directly through a field injection borehole (injection wells), and the oil can be extracted from the oil-bearing rock under the effect of heat and pressure. With increasing duration of injection, the temperature in the reservoir increases in such a way that the strong hydrocarbon solubility of the supercritical fluid produces prerefined products.

For refining at the site, additionally required process and steam requirements can be gained from the supercritical geosteam system.

After the separation of oil, for example, by refining, the geofluid including residual heat can go back into the geosteam system via the injection borehole into the georeservoir for renewed heating, particularly without having to undergo a costly cleaning process.

By using this process variation, an extraction rate of 80% can be achieved.

APPLICATION EXAMPLE II

New or Large Oil Field

For the complete exploitation of a large oil field or oil field sector, for example, with a size of 5×20 km, a horizontal drilling method is to be used according to the invention for the field injections and field production boreholes, with which currently 10 km long horizontal boreholes can be made. FIG. 1 illustrates this example.

The required supercritical geosteam system, for example, with three super-deep boreholes at, for example, 40 cm diameter respectively and a (SSB) georeservoir with a developed volume of 10 km³ has a heat capacity of 2,000 $MW_{th}$ at a production volume of supercritical geosteam of 5 m³/sec at 600 C/600 bar or approximately 1 to/sec. (FIG. 1)

The geo heat exchanger lies deep beneath the field to be developed, centrally between the opposite ends of the field in the center of which the refinery is located at the surface. The three super-deep boreholes can surround the refinery, for example, just like a three-pointed star, whereby the production borehole is positioned close to the refinery.

From the, for example, 5 km long center axis of the field to be developed, at both sides of the center axis, for example, 10 km long horizontal boreholes are made through the, for example, 100 km² wide oil field, until the field is developed. Parallel to the center axis runs a, for example, 5 km-long pressure pipe as distributor for supercritical geosteam, to which the horizontal boreholes are connected. At the opposite ends of the field respective collectors run parallel into which the horizontal boreholes empty and are connected with the refinery by a collector pipe.

BRIEF DESCRIPTION OF THE DRAWINGS

FIG. 3 includes two drawings: The top drawing is a phase diagram for water in which temperature is plotted against pressure. The phases present include solid, and supercritical water. The bottom drawing is a series of five graphs, designated a) through e) in which temperature is plotted against several physical parameters for the recovered hydrocarbons, namely, viscosity, density, dielectric constant, hydrocarbon solubility, and solubility of inorganic substances at a constant pressure of 400 bar.

Figure 1:
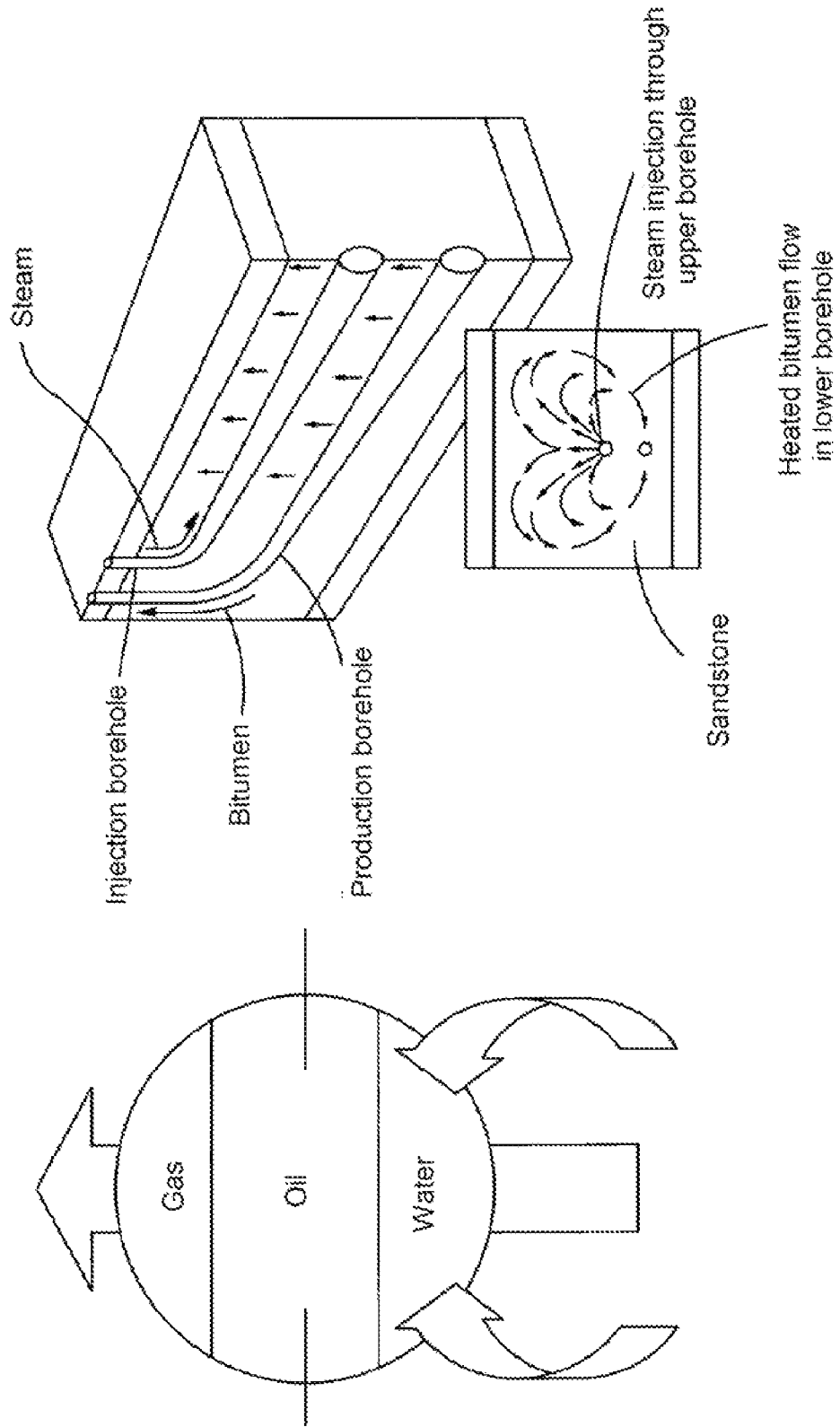
FIG. 1 is a schematic diagram which shows a horizontal drilling method according to the invention for field injections through a series of field production boreholes through which a fluid is injected in order to recover a fossil fuel from a fossil carbon deposit site.

In the following, further setups according to the invention and production variants are described:

IIa. Horizontal boreholes are driven underneath the oil-bearing rock stratum through the water-carrying stratum. (see FIG. 1). From the distributor to the collectors, the supercritical geosteam is injected via the horizontal borehole underneath the oil field and conveyed again by the collector into the injection borehole of the geosteam system, the closed cycle starting again with the heating up of the fluid in the SSB. In this manner, the oil field is heated from below.

In order to achieve even heating of the field, distributors and collectors can also be installed in combination, so that the neighboring horizontal boreholes are respectively flowed through in the opposite direction by the supercritical geosteam.

The oil deposit site is thus evenly heated by the heated water level, the pressure in the reservoir rises and extraction can take place via the horizontal boreholes through the oil deposit under its own pressure, or in old "depleted" fields, the available vertical boreholes are used for transport and conveyance to the refinery. In this manner, all of the oil is, so to speak cooked out of the rock that stored it, so that a removal of oil of over 90% (OIP recovery rate) is possible.

IIb. The horizontal boreholes are, as described here under IIa, not made through the water-holding reservoir rock, but through the center of the oil-bearing reservoir rock. The supercritical geosteam that is injected into the oil deposit via the distributors and its strong hydrocarbon solubility lead to prerefined products that are conveyed to the refinery by the manifolds.

The horizontal boreholes made in such a way through the carbon deposit are without pipes or are provided with a double pipe, the inner pipe being designed as an injection pipe and the outer pipe being designed as a production pipe in which the freed gas and oil in the fluid are conveyed under their own pressure.

During the entire production run, the temperature rises to such a degree as a result of the continuing injection cycle under high production pressure with supercritical geosteam that the oil deposit site fluid also becomes supercritical. Under supercritical conditions the supercritical geofluid advances into all areas of the oil deposit site and all the oil is dissolved.

This fluid with 100% dissolved hydrocarbons can be very simply separated into various fractions by defined pressure reduction.

This type of refining in accordance with the invention can take place right at the start of production by making the fluid that is supplied to the refinery in the collector supercritical as a result of externally or internally applied supercritical geosteam.

IIc. Using the same method according to the invention, gas, oil sand, bitumen and heavy oil deposits or even oil shales can be harvested if they are not too close to the surface. Supercritical geosteam with high temperature and working pressure perform good Frac-work so that the storage medium is quickly and thoroughly unlocked. The art of exploiting hydrocarbon deposits near the surface with supercritical geosteam, as for example, at oil sand storage sites consists primarily in operating evenly progressing in-situ extraction without creating any collapses or pressure breaks in the overlying rock.

Currently, the in-situ extraction of oil sand deposits is done by the SAGD method (steam-assisted gravity drainage). (FIG. 2) Steam is injected in the upper horizontal borehole and the oil flows subject to gravitational forces in the lower horizontal borehole.

This and the hydrocarbon deposits directly at the surface that are preferably extracted by surface mining today already, such as oil sand production in Canada, currently damage the boreal areas of Canada by their high energy consumption, also by steam and electricity production and by combustion products and are an increased burden on the world climate due to high $CO_2$ emissions. Even water contamination and the high consumption by open systems is becoming a serious problem.

With the use of supercritical geosteam according to the invention, the high fuel costs including their combustion systems are eliminated and there are no waste-gas problems created by is combustion.

Water is fed into closed systems and over the SSB (13) georeservoir and in the supercritical fluid, all highly toxic chemical compounds are decomposed.

As the supercritical geosteam systems have a longer life than the fields to be exploited or hydrocarbon deposit sites, care must be taken when placing them so that an optimally large area can be developed.

It is easiest to continue to use the equipment of a depleted oil field area by lateral elongation of the distributors and collectors into neighboring oil field areas and by sinking horizontal boreholes into these newly to be developed oil field parts.

Depending on the position and construction of the hydrocarbon deposit, extraction can take place as described above or also with stellate positioning of the horizontal boreholes, neighboring stars can reach deeply into one another.

IId. Of particular interest in accordance with the invention is also the development of deep coal beds that cannot be traditionally mined by supercritical geosteam injection.

As described under IIb, horizontal boreholes are made directly through the bed and all fractions except for pure carbon are washed out of the coal under high pressure subject to the high hydrocarbon solubility of supercritical geosteam, the fluid that is produced being easily refined at the surface by reducing pressure.

The remaining pure carbon is a valuable product like charcoal or coke for the iron and steel and chemical industry.

By sinking a production borehole according to the sliding-magnet molten-metal drilling method, the carbon coke can be extracted according to the invention by a fluid mining method and thus saves expensive and environmentally burdensome coke ovens and the time-consuming and expensive excavation of borehole systems and underground facilities.

On account of the accessibility of deep-lying coal deposits according to the invention, the coal deposits that can be developed are significantly increased and the previously described carbon hydrogenation with supercritical geosteam increases and expands the availability of fuel for subsequent generations.

After harvesting a coal and hydrocarbon deposit, the supercritical geosteam systems are to be expanded to become supercritical power plants and/or to be used as $SSB-CO_2$ reactors.

Figure 2:
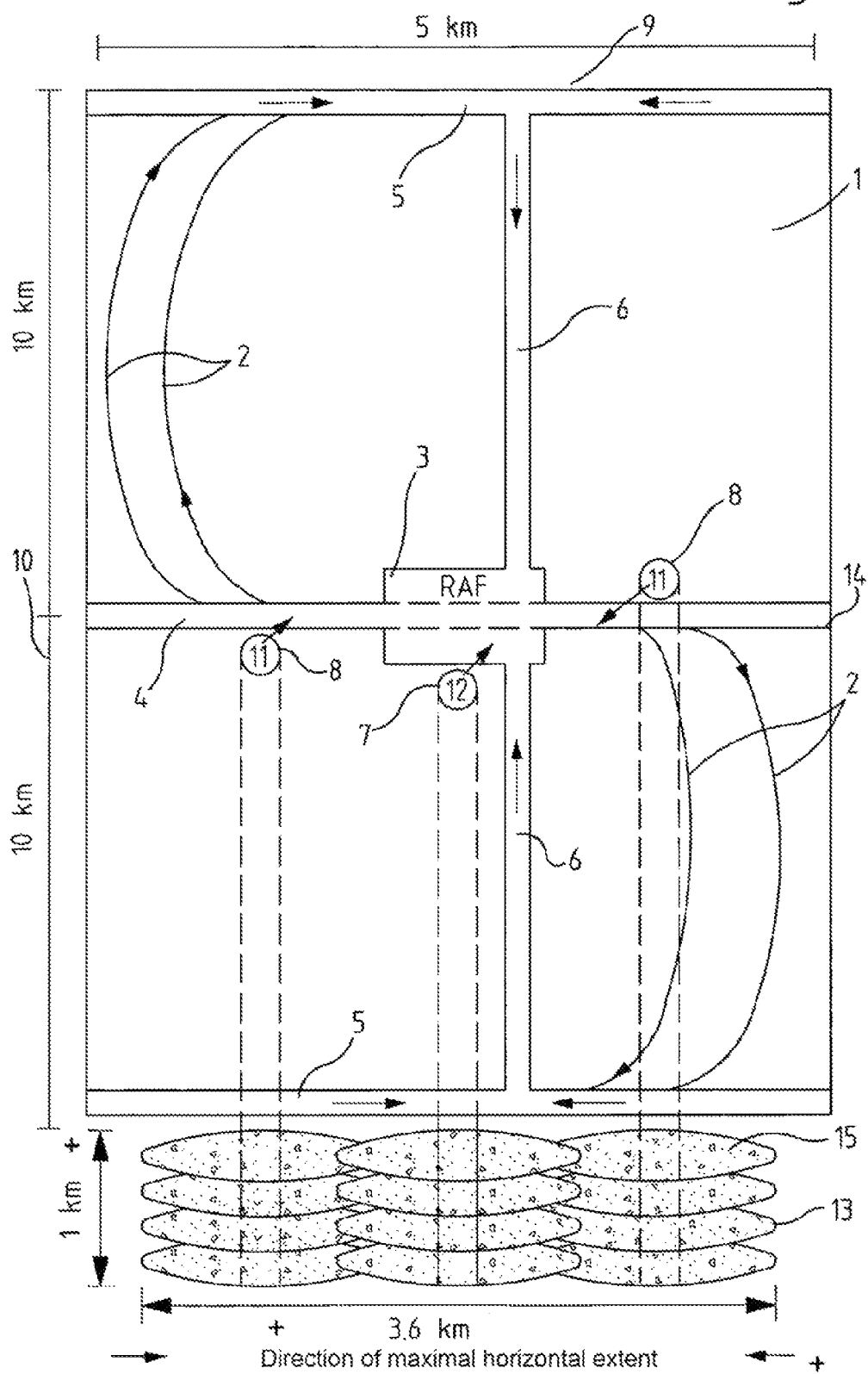
FIG. 2 is a schematic diagram showing the present method in which supercritical geosteam is injected through an injection borehole into a coal or hydrocarbon deposit site, and a production borehole through which a hydrocarbon-enriched fluid flows through a collector transport pipe to a refinery.

FIG. 2 shows the schematic course of a demonstration of the method according to the invention using supercritical geosteam with an injection borehole 7, a production boreholes 8 and SSB (georeservoir 13), with a supercritical geosteam injection 11 into a distributor 4 and via horizontal boreholes 2 into a coal or hydrocarbon deposit site 1. The hydrocarbon-enriched fluid flows in the direction of the arrow (open arrow) through the collector transport pipe 6 to the refinery 3. The fluid remaining after refining 12 is fed again into the closed geo primary cycle via the injection borehole 7 into the SSB georeservoir 13.

The geo primary cycle is a natural-circulation cycle and identified with arrows that are closed at the back. The secondary and production cycle according to the invention that flows to the refinery 3 through the carbon or hydrocarbon deposit 1, is identified by arrows that are open at the back.

The secondary cycle according to the invention is supplied here directly with supercritical geosteam by the production boreholes 8, the production boreholes 8 forming a pressure connection of pressure-resistant pipes via the distributor 4 and horizontal boreholes 2 up to the deposit site 1 and the horizontal boreholes 2 are without casing only at the deposit site, or are provided with perforated pipes.

For ease of viewing, only four horizontal boreholes 2 are shown that otherwise run at spacings from one another through the entire field 1 that is to be developed and exploited.

The tasks developing the field to be harvested can be done at the same time,

While the refinery is being built and the super-deep boreholes are being driven, the horizontal boreholes are sunk through the hydrocarbon or coal deposit site. Logically, the field is developed from the center. The development of the 100 km² deposit by means of horizontal boreholes requires the majority of the development time. As soon as the refinery, supercritical geosteam system is ready for use and the primary and secondary cycles are installed and ready for operation, the production process of an exploitation that is as complete as possible of the deposit site starts with the already present horizontal boreholes that are completed for the entire field during the course of the production time.

Before the supercritical geosteam injection starts at the deposit site, the horizontal boreholes are advantageously flooded with water or a suitable other fluid so that even pressure and temperature buildup can take place at the deposit site at the start of injection, without destroying the horizontal boreholes at the intakes by pressure differences that are too large upon simultaneous unlocking by hydrofracturing.

As long as the deposit site has not yet reached any supercritical conditions, the produced, supercritical hydrocarbon-bearing fluid can be brought into supercritical condition prior to entering the refinery by direct supercritical geosteam injection or indirect heat transfer so that the separation of the various fractions can take place easily by specific reduction in pressure.

As a result of the cost-effective fractioning and the favorable electricity and process steam which has no competition, the fractioned products can be processed in the refinery into high-quality chemical products and be offered inexpensively on the market.

A schematized condition diagram, FIG. 3, shows the outstanding characteristics of supercritical water (SCW) as can be used in the method with systems according to the invention.

The end of the coexistence water/water vapor line is reached at the critical point KP at p=221 bar and T=374° C. Above that point, water is present as a homogeneous fluid phase. The diagram further shows a triple point TP, as well as the various phases, namely I: solid, II: liquids, III: gas and IV: overcritical or supercritical.

The changes of the physical characteristics that are essential at the transition into this area are shown in FIG. 3 below depending on a temperature T at a constant pressure of p=400 bar.

In diagram a) one sees a strong decrease in viscosity $h \times 10-6$ (kg/sm], in diagram b) a moderate decrease in density p[g/ml] as well as in diagram c) a significant decrease in the dielectric constant e. The lower values of the dielectric constant e and as a consequence thereof strong decrease of hydrogen bonds, jointly cause high solubility of covalent substances with the decrease of particle density, such as organic compounds and gases ($O2$, $N2$, $CO_2$) so that hydrocarbons are completely dissolved in the temperature region of 500° C. in supercritical water. Diagram d) schematically shows hydrocarbon solubility.

Hydrocarbons are rarely present in the super-deep area and are not the subject of discussion here. In the method according to the invention it is more important that the solubility of inorganic substances—schematically shown in diagram e) above the critical point—goes to zero. The high solubility of salts in the below-critical area which is a serious corrosion problem in conventional geothermal energy generation is removed at a single stroke above the critical point. No salts dissolve out of the rock any more and salts present in the fluid are precipitated so that salt-free fluid is present. The production boreholes and system inventory are not corroded or tainted by salts.

Of particular advantage is also the significant decrease of viscosity, as a result of it the friction in the geo heat exchanger (SSB) supercritical sub-surface boiler is drastically reduced. Under the static high pressure, supercritical water permeates the smallest cracks and penetrates every rock, even along the crystal surfaces. Likewise, friction in the piping and in the production borehole is minimized so that high flow speed and minimal friction losses are achieved. The friction of water under supercritical conditions becomes smaller by a factor of 1,000 and supercritical fluid flows into the SSB—geo heat exchanger through the smallest cracks in the plutonic rock under the hydrostatic pressure of the cold water column of the injection borehole already and the apparent resistance in the SSB approaches zero.

Simultaneously, heat transition in supercritical water is increased. This has the effect that through the drastic reduction of the viscosity in supercritical fluid the friction during the rise and flow-through of the supercritical fluid in the production boreholes in the large borehole diameters is to be disregarded.

The advantages of the method with systems in accordance with the invention for optimal harvesting and utilization of carbon resources such as oil fields, oil sands, oil shale, coal beds, by using supercritical geosteam injection through super-deep boreholes according to a molten-metal drilling process with respect to conventional methods and $CO_2$ as a raw material base for a hydrocarbon cycle via SC-geosteam as primary energy in the SSB (supercritical sub-surface boiler) as hydrogenation system, are itemized in the following:

1. Use of SC-geosteam for optional harvesting of hydrocarbon deposit sites leads to a tripling of currently known recoverable world oil reserves.

2. The perspective of supercritical geosteam injection alone will put a brake on current oil speculation and keep the price of oil at an affordable level.

3. By using supercritical geosteam injection in the recovery from oil sand and fuel oil, no part of the oil is burned for steam production any more, significant $CO_2$ and contaminant emission is removed, significant environmental and climate burden is lifted, whereby the costs for fuel and fuel facilities are eliminated.

4. In contrast to known in-situ steam injection according to the SAGD method, the method according to the invention does not require two horizontal boreholes that lie above one another through the carbon deposit site that is to be developed (injection and production borehole) but only one borehole with a production length of currently up to 10 km.

5. The horizontal boreholes driven through a carbon deposit site are operated only with one injection pipe, with a double pipe (internally injection pipe and externally production pipe) or entirely without a metal injection pipe.

6. As a result of supercritical geosteam injection, from the 100 largest oil fields of the world alone—which are all developed but depleted or have exceeded their production maximum—once again as much oil can be recovered than humanity has consumed up to now in total.

7. By using supercritical geosteam in the fluid mining method, particularly in deep coal beds that can not be recovered by traditional mining methods, world coal reserves increase significantly by reducing production costs, stress to the surface by mining waste dumps and damage done by mining.

8. The extraction of coal from coal deposit sites without the use of mining but with supercritical geosteam in a fluid mining procedure in combination with coal hydrogenation for fuel production at moderate fuel costs, turns the largest fuel consumers and owners of the richest coal deposits in the world—the US, China, Europe and Australia once again into self-sufficient fuel suppliers 9. The extraction of coal from coal deposit sites without the use of mining by supercritical geosteam in combination with coal hydrogenation for fuel production in-situ by boreholes that are sunk according to the molten-metal method produces pure charcoal or coke that is to be recovered in the fluid mining method and which supplies the iron and steel industry, carbon and chemical industry with high quality coke or charcoal in the future and replaces expensive and environmentally damaging coke ovens.

10. Use of the current climate killer $CO_2$ as basic material for hydrocarbon production by supercritical geofluids in the SSB as natural hydrogenation system for recovering fuel opens a way for the operation of $CO_2$-free automobiles of all kinds.

11. Recycling of $CO_2$ by sequestering $CO_2$ and transforming it into fuel by supercritical geosteam using the SSB as hydrogenation plant, converts the costly waste product $CO_2$ into a valuable raw material for energy.

12. Supercritical geosteam injection for optimal harvesting of coal and hydrocarbon deposit sites secures the fuel needs for a global automotive society of the 21$^{st}$ century and the establishment of a $CO_2$ recycle ensures climate-neutral use.

It is to be noted with respect to each embodiment that the technical characteristics that are mentioned in connection with each embodiment cannot only be used in the specific embodiment, but also respectively in other embodiments. All revealed technical characteristics of this description of the invention are to be classified as essential to the invention and can be used alone or in various combinations as desired.

LEGEND

FIG. 1

1. Coal and hydrocarbon deposit sites or partial field of a deposit site—area=5×20 km
2. Horizontal borehole into the coal and hydrocarbon deposit site or through the water level underneath the deposit sites
3. Refinery
4. Supercritical geosteam distributor to the horizontal boreholes
5. Fluid collector (hydrocarbon-enriched fluid)
6. Collector transport pipe to the refinery
7. Injection borehole to the SSB (georeservoir)
8. Production boreholes for supercritical geosteam
9. Width of the field to be developed
10. Length of the field to be developed
11. Supercritical geosteam feeder into the distributor
12. Processed fluid back into the SSB (georeservoir)
13. SSB (supercritical sub-surface boiler)
14. Field center line
15. Ellipsoid (double-sided heat exchange areas)

The invention claimed is:

1. A method of recovering a fossil fuel from a fossil carbon deposit site, which comprises the steps of:
   (a) driving several boreholes into the earth's crust through plutonic rock to depths below the surface at which supercritical conditions predominate, by means of a molten metal drilling process, wherein each of the several boreholes is provided with a continuously created, one-piece metal borehole casing and wherein the several boreholes are drilled, so that they are spaced from one another in a lower borehole region, and connected there to one another through crack formation in the plutonic rock to form a geo-heat exchanger resulting in creation of a supercritical geo-steam system;
   (b) injecting a fluid into at least one of the several boreholes, operating as an injection borehole, into the plutonic rock, to convert the injected fluid into a supercritical fluid, and extracting the supercritical fluid from the plutonic rock through other of the several boreholes operating as at least one production borehole; and
   (c) injecting the supercritical fluid extracted according to step (b) into the fossil carbon deposit site to dissolve hydrocarbons from the fossil carbon deposit site in the supercritical fluid, and transporting the supercritical fluid laden with the hydrocarbons to the surface and recovering of the hydrocarbons.

2. The method according to claim 1 wherein according to step (b) the injection borehole, the geo heat exchanger, the at least one production borehole, and the fossil carbon deposit site form a closed cycle.

3. The method according to claim 1 wherein according to step (c) the supercritical geosteam system and a refinery are located at the fossil carbon deposit site, and wherein the at least one production borehole is located in direct proximity to the refinery.

4. The method according to claim 3 wherein the fossil carbon deposit site is provided with horizontal boreholes and wherein the supercritical fluid is injected via distributors into the horizontal boreholes and in collectors and via at least one collector transport pipe the supercritical fluid is conveyed to the refinery from where the fluid that has been separated from the hydrocarbons flows back again into the injection borehole of the supercritical geosteam system and the cycle is closed.

5. The method according claim 4 wherein the hydrocarbons dissolved in the supercritical fluid that are transported to the refinery under high pressure are separated and refined out of the fluid by a reduction in pressure.

6. The method according to claim 3 wherein the fluid conveyed to the refinery when it is not yet or no longer supercritical is made supercritical indirectly by supercritical fluid and/or by direct injection as a bypass from the at least one production borehole and is thus made available to the refinery for processing.

7. The method according to claim 3 wherein the refinery is supplied with electricity and/or process steam by a combination of a supercritical heat power plant and a compressed water power plant that are in turn fed by the at least one production borehole of the supercritical geosteam system.

8. The method according to claim 1 wherein according to step (c) the recovered hydrocarbons that are highly volatile rise to the upper part of the deposit site subject to pressure and temperature increases as a consequence of the injection of supercritical fluid and are extracted there as gas.

9. The method according to claim 1 wherein the fossil carbon deposit site is an old, depleted oil field and wherein for injection and transport of supercritical fluid, available vertical boreholes are utilized as injection and production boreholes in such a way that the surrounding production boreholes are supplied by one injection borehole, the injection boreholes being driven down to a water-bearing level of reservoir rock.

10. The method according to claim 1 wherein according to step (c) for complete exploitation of an oil field as the fossil carbon deposit site by injection of supercritical fluid, horizontal boreholes are driven through a water-bearing level underneath the oil field or oil field areas to be exploited through which the supercritical fluid flows in a closed system cycle from the production boreholes via distributors and collectors at the opposite ends of the production field to the injection borehole and the oil is cooked out of the oil-bearing rock and is conveyed to a refinery under its own pressure via vertical and/or horizontal boreholes.

11. The method according to claim 1 in which according to step (c), recovery of hydrocarbon-enriched, already heated but not supercritical fluids from the fossil carbon deposit site takes place via a collector transport pipe and not via a refinery, but directly back via an injection borehole into the geo heat exchanger, where the hydrocarbons which are subject to the strong hydrocarbon solubility of the supercritical fluid, are dissolved and subjected to free hydrogen in the geo heat exchanger which is partially catalyzed into hydrocarbon compounds, and in the further cycle the hydrocarbons at the head of the production boreholes are removed together with heat in a separation system in an SC power plant.

12. The method according to claim 1 wherein only the injection borehole lies central in the oil field as the fossil carbon deposit site to be exploited and the production boreholes are positioned with respectively one refinery at the field opposite ends of the production field, whereby the distributors and correspondingly the collectors are placed to the middle line of the field, whereby the production boreholes that are spaced from each other are connected in the plutonic rock centrally under the production field by a 60° incline with the geo heat exchanger and the injection borehole.

13. A method of building a $CO_2$ cycle for producing high quality hydrocarbons, which comprises the steps of:
  (a) driving several boreholes into the earth's crust through plutonic rock to depths below the surface at which supercritical conditions predominate, by means of a molten metal drilling process, wherein each of the several boreholes is provided with a continuously created, one-piece metal borehole casing and wherein the several boreholes are drilled, so that they are spaced from one another in a lower borehole region, and connected there to one another through crack formation in the plutonic rock to form a geo-heat exchanger resulting in creation of a supercritical geo-steam system comprising a supercritical; fluid;
  (b) injecting sequestered $CO_2$, or carbon into at least one of the several boreholes, operating as an injection borehole, into plutonic rock, into the geo-heat exchanger formed according to step (a) and hydrogenating the sequestered $CO_2$ or carbon in the geo-heat exchanger with a supercritical fluid, to obtain methane and/or higher hydrocarbons and/or methanol; and
  (c) recovering the methane and/or higher hydrocarbons and/or methanol from the geo-heat exchanger.

14. A system for exploiting a fossilized carbon deposit site which comprises:
  a plurality of boreholes created by a molten metal drilling process through plutonic rock that each have a respective continuously created one-piece metal borehole casing, and wherein the boreholes are spaced from one another;
  a supercritical geosteam system formed by the plurality of boreholes that are sunk to depths at which supercritical conditions predominate, and in a lower region the plurality of boreholes are connected to one another by crack formations that form a geo heat exchanger;
  means for injecting a supercritical fluid into a fossil carbon deposit site within the system so that carbon resources at the carbon deposit site are dissolved and can be transported to the surface; and wherein
  at least one of the plurality of boreholes is operated as an injection borehole as a means to inject into the plutonic rock a fluid that can be brought into supercritical condition in the crack formations to form a supercritical fluid which is extracted from the plutonic rock by at least one additional borehole of the plurality of boreholes which is operated as a production borehole.

15. The system according to claim 14 further comprising a refinery wherein via the geo heat exchanger a closed forced cycle for the exploitation of the carbon deposit site exists that starts with the injection of supercritical fluid from at least one production borehole, is conveyed to a refinery via the distributor and the horizontal boreholes into the collectors and collector transport pipe and after separation of the hydrocarbon in the refinery, the remaining fluid is conveyed back into the injection borehole.

16. The system according to claim 15 wherein supercritical fluid can be injected via a bypass indirectly or as direct injection from the production borehole into the fluid conveyed to the refinery that is enriched with hydrocarbons when it is not yet or no longer supercritical, so that in the refinery a preliminary product that arrives there in supercritical condition can be separated and refined at any time.

17. The system according to claim 15 wherein the electricity and process steam supply of the refinery is provided by the same supercritical fluid.

18. The system according to claim 15 wherein the supercritical geosteam system and the refinery are located in the middle of the field of a deposit site that is to be exploited, a production borehole lying in direct proximity of the refinery.

19. The system according to claim 14 wherein the heating of a deposit site with supercritical fluid takes place via driven horizontal boreholes whose flow is in the opposite direction as the respective neighboring boreholes, by installing a distributor and a collector at the middle line of the field as well as at the opposite ends.

20. A system for building a $CO_2$ cycle including several boreholes created by a molten metal drilling process that are provided respectively with a continuously created one-piece metal borehole casing wherein the boreholes are sunk to depths at which supercritical conditions predominate and the boreholes that are spaced from one another in a lower borehole region, are connected with one another by crack formations that form a geo heat exchanger and sequestered $CO_2$ or carbon can be hydrogenated as raw material with supercritical fluid.

* * * * *

UNITED STATES PATENT AND TRADEMARK OFFICE
CERTIFICATE OF CORRECTION

PATENT NO.       : 8,235,141 B2
APPLICATION NO.  : 12/301104
DATED            : August 7, 2012
INVENTOR(S)      : Werner Foppe Page 1 of 1

It is certified that error appears in the above-identified patent and that said Letters Patent is hereby corrected as shown below:

On the Title Page

(73) Assignee: Franz Josef Radermacher, Ulm (DE)

should be

(73) Assignee: Werner Foppe, Geilenkirchen (DE) - 90% right title and interest
               Franz Josef Radermacher, Ulm (DE) - 10% right title and interest Signed and Sealed this
Twenty-eighth Day of May, 2013

Teresa Stanek Rea
*Acting Director of the United States Patent and Trademark Office*